United States Patent [19]

Stork et al.

[11] Patent Number: 5,245,696
[45] Date of Patent: Sep. 14, 1993

[54] EVOLUTION AND LEARNING IN NEURAL NETWORKS: THE NUMBER AND DISTRIBUTION OF LEARNING TRIALS AFFECT THE RATE OF EVOLUTION

[75] Inventors: David G. Stork, Stanford; Ronald C. Keesing, Menlo Park, both of Calif.

[73] Assignees: Ricoh Co. Ltd., Tokyo, Japan; Ricoh Corporation, Menlo Park, Calif.

[21] Appl. No.: 616,029

[22] Filed: Nov. 21, 1990

[51] Int. Cl.[5] .............................................. G06F 15/18
[52] U.S. Cl. ...................................... 395/13; 395/23; 395/24
[58] Field of Search ............................. 395/13, 23, 24

[56] References Cited

U.S. PATENT DOCUMENTS 4,935,877  6/1990  Koza ...................................... 395/13
5,048,095  9/1991  Bhanu et al. ........................... 395/13

OTHER PUBLICATIONS

A Darwinian Approach to Artificial Neural Networks; Dress et al.; Proc. of System, Man, & Cybernetics Conf; 1987; pp. 572-577.
Towards the Evolution of Symbols; Dolan et al.; Proc of the Second Inter. Conf. on Genetic Algorithms; Jul. 28-31, 1987; pp. 123-131.
How Learning Can Guide Evolution; Hinton and Nowlan; Complex Systems 1 (1987) 495-502.
Symbolic Schemata in Connectionist Memories: Role Binding and the Evolution of Structure; Dolan and Dyer; UCLA-AI-87-11; pp. 1-23; 1987.
Designing Neural Networks Using Genetic Algorithms; Miller, Todd, and Hegde; ICGA '89; George Mason University, Fairfax, Va.; pp. 379-383; Jun. 4-7, 1989.
Towards the Genetic Sysntesis of Neural Networks; Harp, Samad, and Guha; ICGA '89; George Mason University, Fairfax, Va.; pp. 360-369; Jun. 4-7, 1989.
Using Genetic Search to Exploit the Emergent Behavior of Neural Networks; Schaffer, Caruana, and Eshelman; Physica D 42 (1990) 244-248.

*Primary Examiner*—Allen R. MacDonald
*Attorney, Agent, or Firm*—Heller, Ehrman, White & McAuliffe

[57] ABSTRACT

The present invention relates to the interrelationships between nature (as mediated by evolution and genetic algorithms) and nurture (as mediated by gradient-descent supervised learning) in a population of neural networks for pattern recognition. The Baldwin effect is demonstrated that learning can change the rate of evolution of the population's genome - a "pseudo-Lamarkian" process, in which information learned is ultimately encoded in the genome by a purely Darwinian process. Selectivity is shown for this effect: too much learning or too little learning in each generation leads to slow evolution of the genome, whereas an intermediate amount leads to most rapid evolution. For a given number of learning trials throughout a population, the most rapid evolution occurs if different individuals each receive a different number of learning trials, rather than the same number. Because all biological networks possess structure due to evolution, it is important that such interactions between learning and evolution be understood. Hybrid systems can take advantage both of gradient descents (learning) and large jumps (genetic algorithms) in very complicated energy landscapes and hence may play an increasingly important role in the design of artificial neural systems.

10 Claims, 10 Drawing Sheets

A DETECTOR   B DETECTOR   C DETECTOR   D DETECTOR  .....
00101101010100110  00111010100110101001101010011010100110101001101010011010100110101001101010011101111......

00 | 01 | 10 | 11  POSSIBLE VALUES AT A SPATIAL POSITION

VERTICAL(V)
HORIZONTRAL(H)
DIAGONAL(D)
DIAGONAL(D)

| 00 | 01 | 10 | 11 |
|----|----|----|----|
| 3  | 1  | 1  | 1  |
| 1  | 3  | 1  | 1  |
| 1  | 1  | 3  | 1  |
| 1  | 1  | 1  | 3  |

NETWORK LABELS

APPROACH A

| | 1  2  3  4 ... |
|---|---|
| GENERATION 1 | 40, 40, 40, 40, ... |
| GENERATION 2 | 40, 40, 40, 40, ... |
| GENERATION 3 | 40, 40, 40, 40, ... |
| GENERATION 4 | 40, 40, 40, 40, ... |
| ..... | ........ |

*FIG. 15A*

APPROACH B

| | 1  2  3  4 ... |
|---|---|
| GENERATION 1 | 60, 60, 60, 60, ... |
| GENERATION 2 | 20, 20, 20, 20, ... |
| GENERATION 3 | 30, 30, 30, 30, ... |
| GENERATION 4 | 40, 40, 40, 40, ... |
| ..... | ........ |

*FIG. 15B*

APPROACH C

| | 1  2  3  4 ... |
|---|---|
| GENERATION 1 | 60, 20, 30, 30, ... |
| GENERATION 2 | 30, 40, 10, 70, ... |
| GENERATION 3 | 20, 30, 10, 60, ... |
| GENERATION 4 | 30, 20, 40, 60, ... |
| ..... | ........ |

*FIG. 15C*

EVOLUTION AND LEARNING IN NEURAL NETWORKS: THE NUMBER AND DISTRIBUTION OF LEARNING TRIALS AFFECT THE RATE OF EVOLUTION

BACKGROUND OF THE INVENTION

The present invention relates to evolution and learning in neural networks for use in various applications, such as, for example, pattern recognition techniques.

The structure and function of a biological network derives from both its evolutionary precursors and real-time learning. Genes specify (through development) coarse attributes of a neural system, which are then refined based on experience in an environment containing more information—and more unexpected information—than the genes alone can represent. Innate neural structure is essential for many high level problems such as scene analysis and language [Chomsky, 1957].

Although the Central Dogma of molecular genetics [Crick, 1970] implies that information learned cannot be directly transcribed to the genes, such information can appear in the genes through an indirect Darwinian process (see below). As such, learning can change the rate of evolution - the Baldwin effect [Baldwin, 1896]. Hinton and Nowlan [1987] considered a closely related process in artificial neural networks, though they used stochastic search and not learning per se. Present here are analyses and simulations utilizing learning, and demonstration of selectivity for the effect.

SUMMARY OF THE INVENTION

The present invention relates to the interrelationships between nature (as mediated by evolution and genetic algorithms) and nurture (as mediated by gradient-descent supervised learning) in a population of neural networks for pattern recognition. The Baldwin effect is demonstrated that learning can change the rate of evolution of the population's genome—a "pseudo-Lamarkian" process, in which information learned is ultimately encoded in the genome by a purely Darwinian process. Selectivity is shown for this effect: too much learning or too little learning in each generation leads to slow evolution of the genome, whereas an intermediate amount leads to most rapid evolution.

For a given number of learning trials throughout a population, the most rapid evolution occurs if different individuals each receive a different number of learning trials, rather than the same number. Because all biological networks possess structure due to evolution, it is important that such interactions between learning and evolution be understood. Hybrid systems can take advantage both of gradient descents (learning) and large jumps (genetic algorithms) in very complicated energy landscapes and hence may play an increasingly important role in the design of artificial neural systems.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 13-A depict a genetic representation of initial weights.

FIG. 13-B illustrates relative initial weights between filters and category.

FIG. 14-A depict a diagram of network architecture.

FIG. 14-B depicts a digram of 10 training patterns.

FIG. 14-C depicts a figure of a presentation including translation.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, modifications and equivalents, which may be included within the spirit and scope of the invention as defined by the appended claims.

A general overview of the novel aspects of the present invention will now be described, to be followed by a more detailed example, together with a more detailed overview of prior art approaches.

Figure 1:
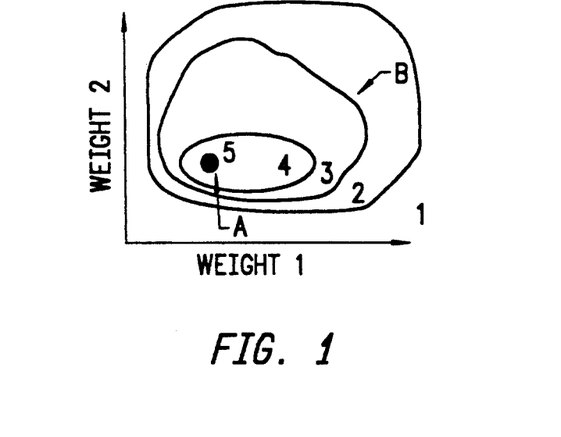
FIG. 1 depicts a diagram of iso-fitness contours in synaptic weight space.

Consider a population of networks for pattern recognition, where initial synaptic weights (weights "at birth") are determined by genes. FIG. 1 shows the Darwinian fitness of networks (i.e., how many patterns each can correctly classify) as a function the weights. Iso-fitness contours are not concentric, in general. The tails of the arrows represent the synaptic weights of networks at birth. In the case of evolution without learning, network B has a higher fitness than does A, and thus would be preferentially selected. In the case of gradient-descent learning before selection, however, network A has a higher fitness, and would be preferentially selected (tips of arrows). Thus learning can change which individuals will be selected and reproduce, in particularly favoring a network (here, A) whose genome is "good" (i.e., initial weights "close" to the optimal), despite its poor performance at birth. Thus, what A has learned is encoded into the genome indirectly by a "pseudo-Lamarkian" process the rate of gene evolution is thereby increased (the Baldwin effect).

FIG. 1 shows iso-fitness contours in synaptic weight space. The black region corresponds to perfect classifications (fitness=5). The weights of two networks are shown at birth (tails of arrows), and after learning (tips of arrows). At birth, B has a higher fitness score (2) than does A (1); a pure genetic algorithm (without learning) would preferentially reproduce B. With learning, though, A has a higher fitness score (4) than B (2), and would thus be preferentially reproduced. Since A's genes are "better" than B's, learning can lead to selection of better genes.

Surprisingly, too much learning leads to slow evolution of the genome, since after sufficient training in each generation, all networks can perform perfectly on the pattern recognition task, and thus are equally likely to pass on their genes, regardless of whether they are "good" or "bad."

In one embodiment, the present system comprises a population of 200 networks, each for classifying pixel images of the first five letters of the alphabet. The $9 \times 9$ input grid is connected to four $7 \times 7$ sets of overlapping $3 \times 3$ orientation detectors; each of these detectors is fully connected by modifiable weights to an output layer containing five category units (FIG. 2).

Each network has a 490-bit gene specifying the initial weights. For each of the 49 filter positions and 5 categories, the gene has two bits which specify which orientation is initially most strongly connected to the category unit (by an arbitrarily chosen factor of 3:1). During training, the weights from the filters to the output layer are changed by (supervised) perceptron learning. Darwinian fitness is given here by the number of patterns correctly classified after training. We use fitness-proportional reproduction and the standard genetic algorithm processes of replication, mutation, and crossover [Holland, 1975]. Note that while fitness may be measured after training, reproduction is of the genes present at birth, in accord with the Central Dogma.

Figure 2:
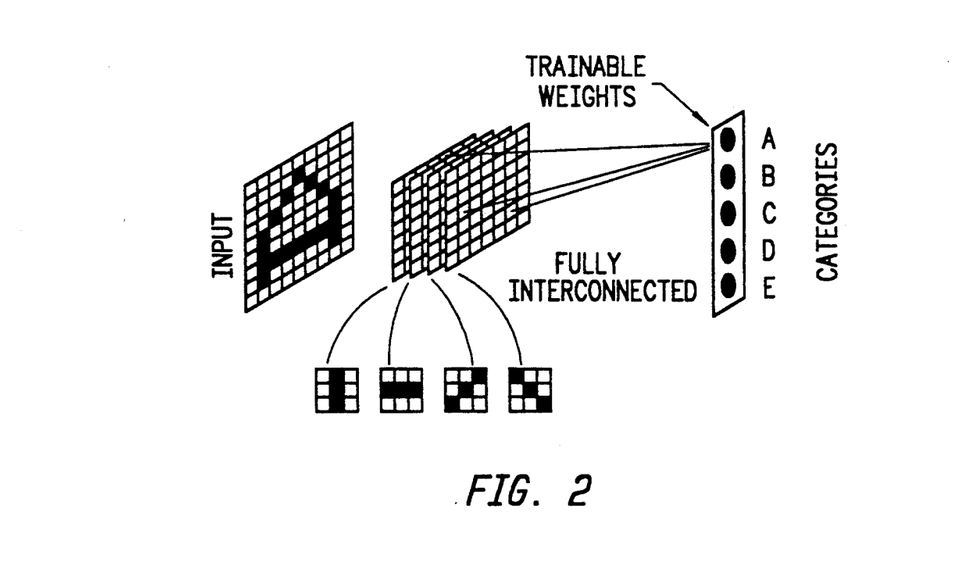
FIG. 2 depicts a diagram of individual network architecture.

FIG. 2 shows individual network architecture. The $9 \times 9$ pixel input is detected by each of four orientation selective input layers ($7 \times 7$ unit arrays), which are fully connected by trainable weights to the five category units. The network is thus a simple perceptron with 196 ($=4 \times 7 \times 7$) inputs and 5 outputs. Genes specify the initial connection strengths.

For a given total number of teaching presentations reproductive fitness might be defined in many ways, including categorization score at the end of learning or during learning; such functions will lead to different rates of evolution. We show simulations for two schemes: in uniform learning each network received the same number of presentations; in distributed learning networks received a randomly chosen number of presentations, with fitness determined after learning.

RESULTS AND DISCUSSION

Figure 3:
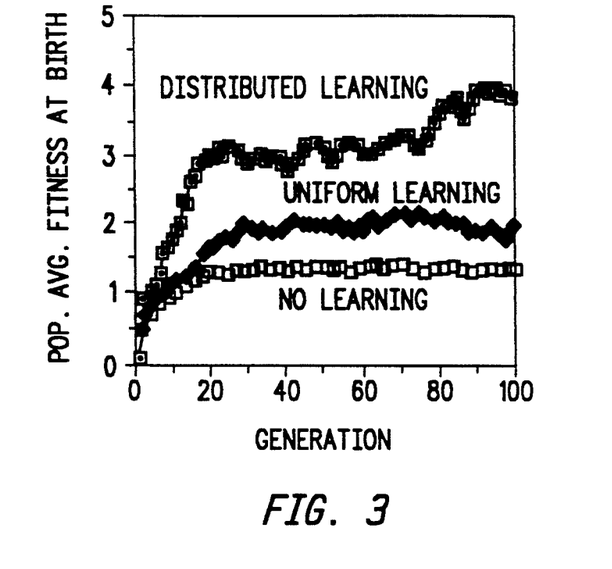
FIG. 3 depicts a population average fitness at birth for different learning schemes.

FIG. 3 shows the average fitness at birth in a population. Note especially that learning increases the rate of evolution the two learning curves are well above the "No Learning" curve. The fitness after learning in a generation (not shown) is typically only 5% higher than the fitness at birth. Such a small improvement at a single generation cannot account for the overall high performance at later generations. A network's performance even after learning is more dependent upon its ancestors having learned than upon its having learned the task.

Note too in FIG. 3 that distributed learning leads to significantly faster evolution (higher fitness at any particular generation) than uniform learning. In the uniform learning scheme, once the networks have evolved to a sufficiently small "distance" in weight space from the ideal, learning can then lead to perfect performance; there is no more "pressure" on the genes to evolve. In contrast, in the distributed learning scheme (and in schemes in which fitness is determined in part during learning), there is "pressure" on the genes to improve at every generation.

FIG. 3 shows that learning guides the rate of evolution. In uniform learning, every network in every generation receives 20 learning presentations; in the distributed learning scheme, networks receive a number of patterns randomly chosen between 0 and 40 presentations (mean=20). Clearly, evolution with learning leads to significantly superior genes (fitness at birth) than evolution without learning.

Figure 4:
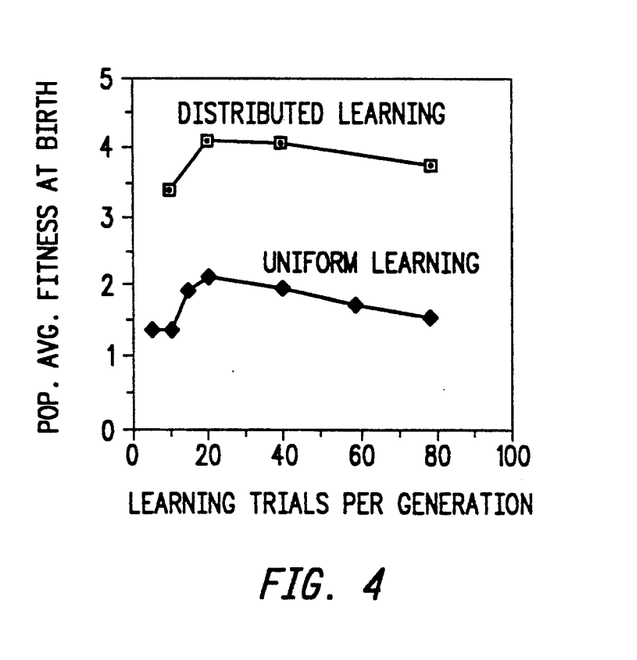
FIG. 4 depicts an average fitness at generation 100 depending upon the amount of training.

FIG. 4 shows selectivity of learning-evolution interactions. Too little or too much learning leads to slow evolution (population fitness at birth at generation 100) while an intermediate amount of learning leads to significantly higher such fitness. This effect is significant in both learning schemes. (Each point represents the mean of five simulation runs.)

FIG. 4 illustrates the tuning of these learning-evolution interactions, as discussed above: too little or too much learning leads to poorer evolution than does an intermediate amount of learning. Given excessive learning (e.g., 500 presentations, not shown) all networks perform perfectly. This leads to the slowest evolution, since select on is independent of the quality of the genes.

Evolutionary search via genetic algorithms is a powerful technique for avoiding local minima in complicated energy landscapes [Goldberg, 989]. The present approach offers advantages over evolutionary search alone in the single-minimum landscape given by perceptron learning. In landscapes with multiple minima, the benefits of hybrid systems can be even more pronounced.

PREVIOUS OPTIMIZATION SCHEMES

Conventional Neural Networks

Conventional back propagation (e .g., Rumelhart, McClelland and Williams, 1986) the most popular neural network learning algorithm employs gradient-descent learning to reduce error. (Error is the sum over all patterns of the square of the difference between the actual output of the network and the desired output.)

Figure 5:
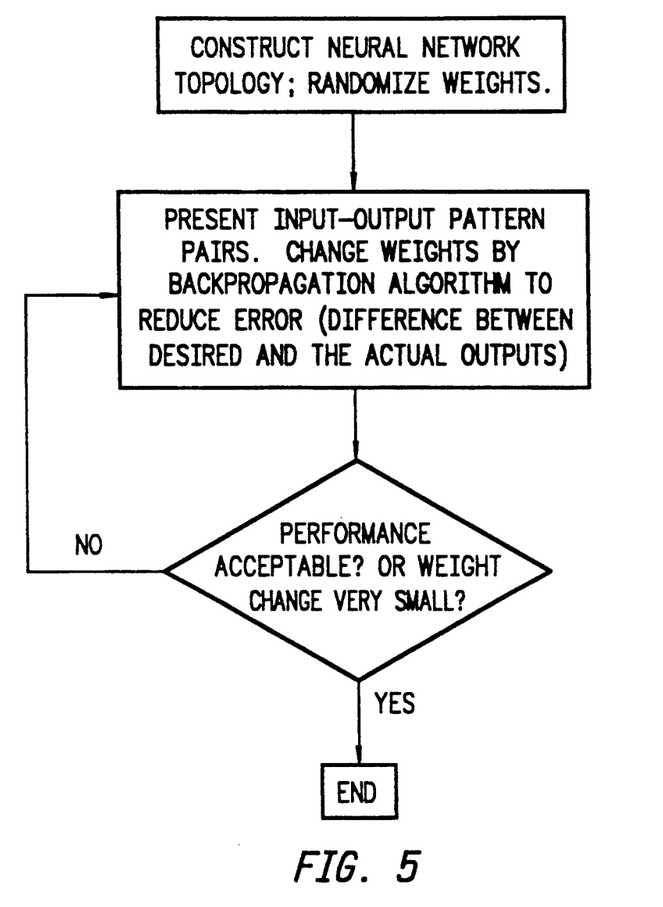
FIG. 5 depicts a flow chart illustrating a standard back propagation technique.

FIG. 5 shows that standard back propagation starts with a network with randomly chosen connection weights, and changes these weights by presenting input-output pattern pairs until the error is acceptably small.

Figure 6:
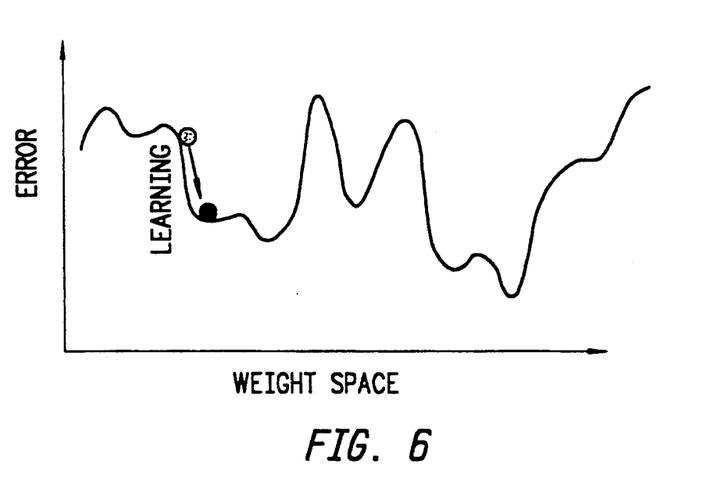
FIG. 6 depicts a diagram of a standard neural network learning algorithm.

For very complicated, high dimensional problems, the error surface can be very complicated. Such "hard" problems appear in speech recognition, three-dimensional scene analysis, economics, and many other disciplines. FIG. 6 shows a drawback of this standard neural network approach: networks can get caught in local minima, rather than global minima.

FIG. 6 shows that standard neural network learning algorithms start with a network in some randomly chosen position (gray dot). Gradient-descent learning reduces the error to yield a network that has less error (dark grey dot). An important drawback of standard learning schemes is that networks can get caught in local (non-optimal) minima, as shown by the position of the dark dot.

One drawback of conventional neural networks is local minima.

The present method avoids this problem of local minima by permitting large jumps in weight space (see below).

Conventional Genetic Algorithms

Conventional genetic algorithms (as proposed by John Holland, 1975) are based on the process of evolution, in which each system (here, network) performs a task. Those systems that perform worst on the task are removed from the population, while those systems that perform best on the task are permitted to reproduce to give a subsequent population of yet other systems. (The method of reproduction is given by John Holland's genetic processes of replication, cross-over and mutation.) The networks in the subsequent generation each perform the task, and those that perform best are allowed to reproduce.

Figure 7:
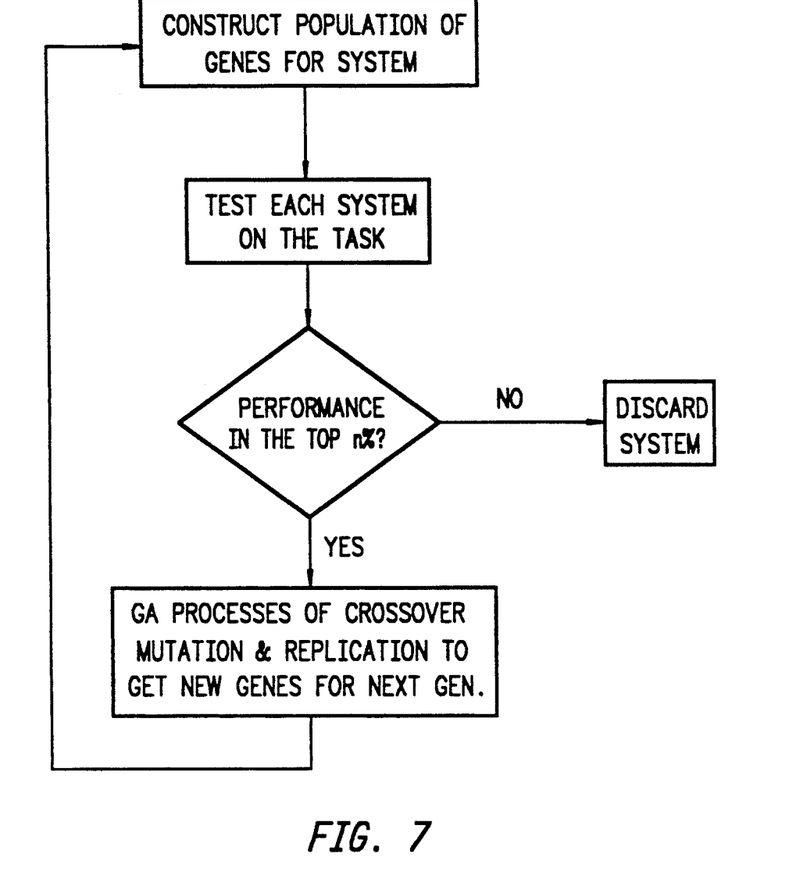
FIG. 7 depicts a flow chart illustrating a standard genetic algorithm.

In this way, each generation performs better on the task (on average) than the previous generation. In fact, genetic algorithms a guaranteed to find the global optimum (here, minimum error) given sufficient time. Unfortunately, such evolution can require a great deal of time. FIG. 7 shows a simple flow chart of the genetic algorithm. Genes are typically represented by strings of 0's and 1's.

FIG. 7 shows a standard genetic algorithm that starts with a population of randomly chosen genes. These genes lead to systems whose fitness is tested on the problem to be solved.

Figure 8:
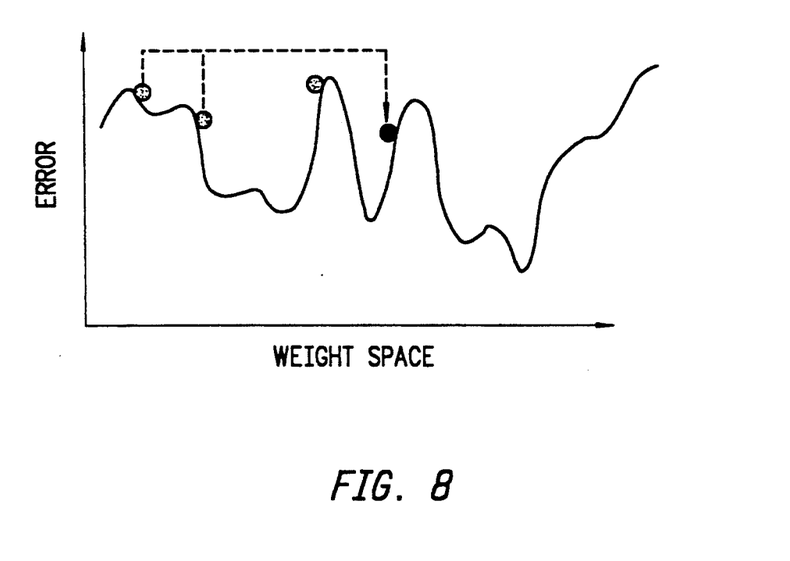
FIG. 8 depicts another diagram of a standard genetic algorithm.

Networks on one generation are permitted to survive and lead through genetic processes to the next generation. FIG. 8 shows how a standard genetic algorithm (without learning) starts with a population of networks (here, three gray dots at the left), each in some randomly chosen position. Those networks that perform best (i.e., have lowest error), survive and are allowed to breed new networks for the next generation (dark gray dot). In the example shown, the two networks at the extreme left have the lowest error (of the three gray dots), and hence are permitted to reproduce, thereby giving the dark dot at the right (shown by the dashed lines). The genetic processes shown give large jumps in weight space. The network represented by the grey dot to the right is removed due to poor performance.

A drawback of conventional genetic algorithms is very slow convergence. The present method avoids the problem of slow convergence by incorporating learning (see below).

Novel Hybrid Algorithm

Figure 9:
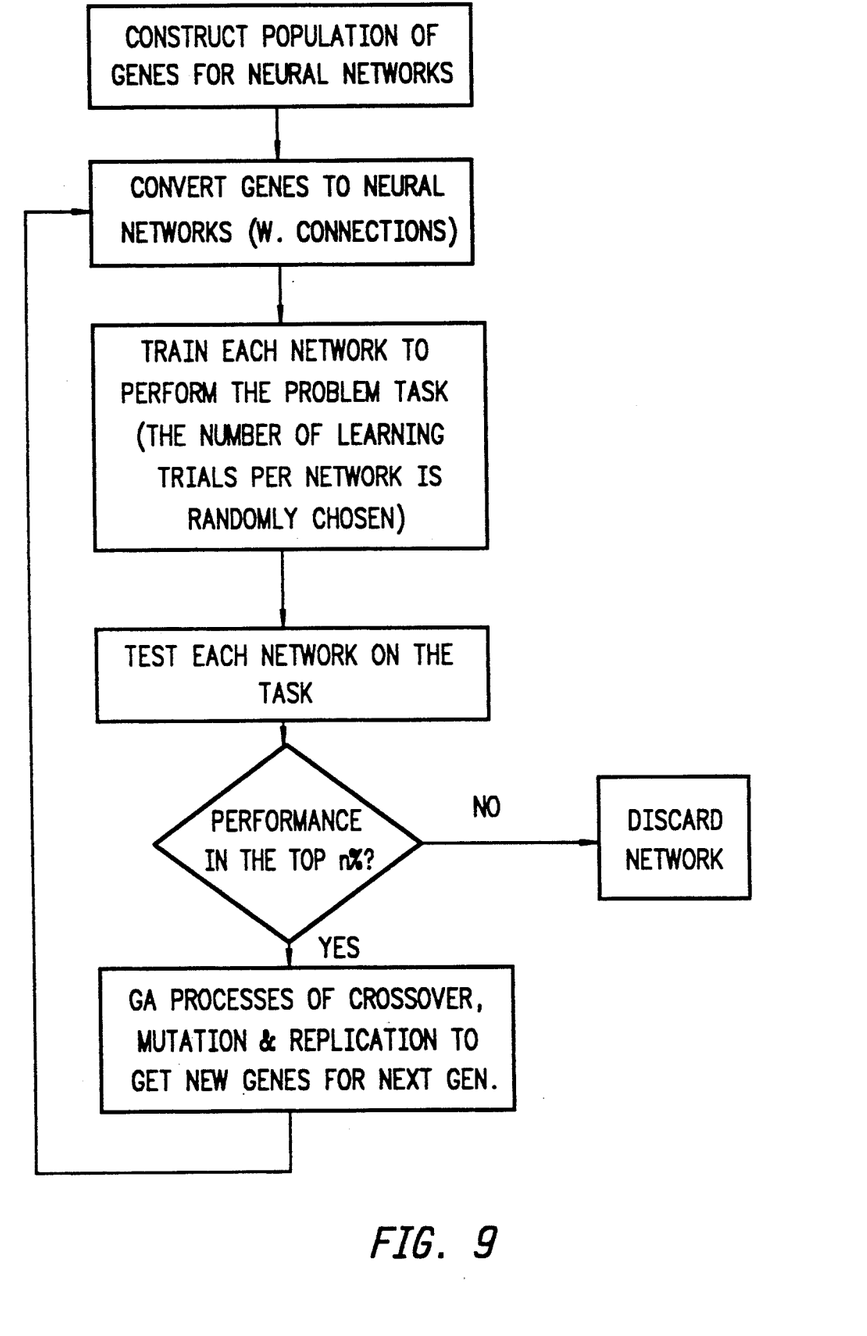
FIG. 9 depicts an overall flow chart for an improved algorithm according to the present invention.

In order to speed up the evolution governed by a conventional genetic algorithm, a hybrid algorithm is disclosed which employs both evolution (as performed by genetic algorithms) as well as gradient-descent learning. The system preserves the beneficial aspects of genetic algorithms (i.e., finding global minima), but has increased speed. FIG. 9 shows a flow chart for the algorithm.

Note especially the difference between the hybrid approach (FIG. 9) and the conventional genetic algorithm (FIG. 7): In each generation, every network is permitted to learn, thereby increasing its fitness. The amount of learning differs for each network: some networks are given many learning trials, while others only few. The assignment of the number of learning trials is based on a uniform distribution.

Figure 10:
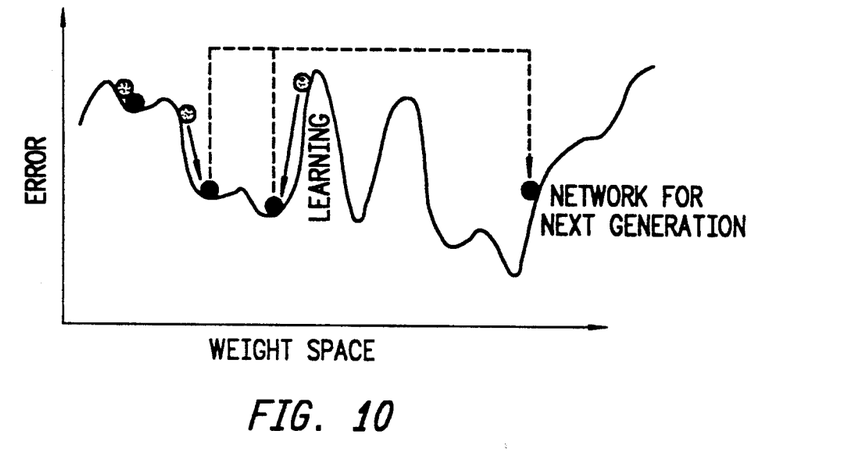
FIG. 10 depicts a diagram illustrating a novel hybrid neural network.

The power of the hybrid algorithm is in its ability to enable "good" networks to survive and reproduce whereas without learning those networks would not be able to reproduce. By "good" networks, it is meant those networks that have properties required for optimal performance, e.g., can solve part of the problem perfectly. FIG. 10 shows the important effect of including learning in the algorithm.

On one generation, three networks are shown (light gray circles, at left). They are permitted to learn by gradient descent. Their fitness is computed after this learning. Note that one of the networks which had the poorest performance at birth nevertheless after learning has the best performance (lowest error). Hence in this hybrid scheme that network is permitted to reproduce.

FIG. 10 shows the novel hybrid neural network-genetic algorithm scheme (with learning) starts with a population of networks, each in some randomly chosen position (e.g., three gray dots at left), and permits each to reduce error through learning. Selection takes the best performing networks (lowest error after learning), and permits them to breed a new network, via the genetic processes of mutation, crossover and replication shown by the dashed lines. This new network is shown as the gray dot at the right. The genetic processes give large jumps in weight space. The network represented by the grey dot on the extreme left is removed due to poor performance. Note: in FIG. 8 (without learning) the same three initial networks led to a different, worse network in the next generation, since there was no learning.

Figure 11:
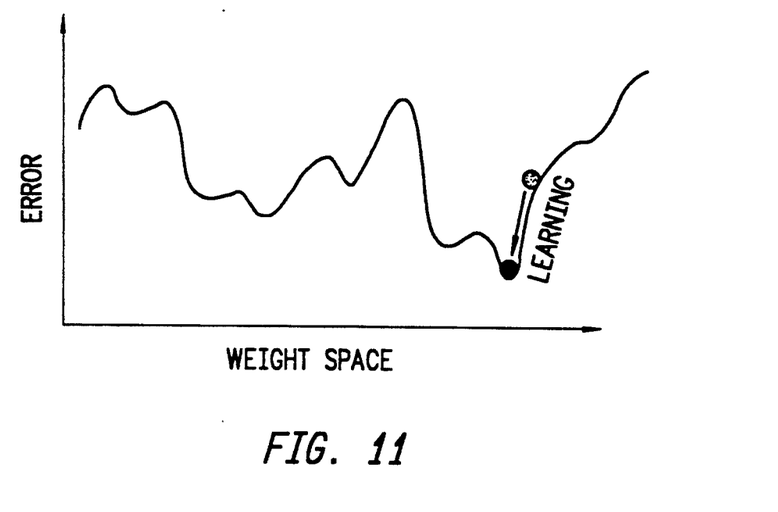
FIG. 11 depicts a diagram of a second generation of an improved technique according to the present invention.

FIG. 11 shows that in the second generation in the novel scheme, the new networks (e.g., the dark gray dot from FIG. 8) learn and descend in error, here, reaching the global minimum (optimal solution). A conventional genetic algorithm would require a very long time to reach this global minimum.

The novel system and method according to the present invention avoids the drawbacks of both conventional gradient-descent learning (local minima) and conventional genetic algorithms (slow convergence).

Figure 12:
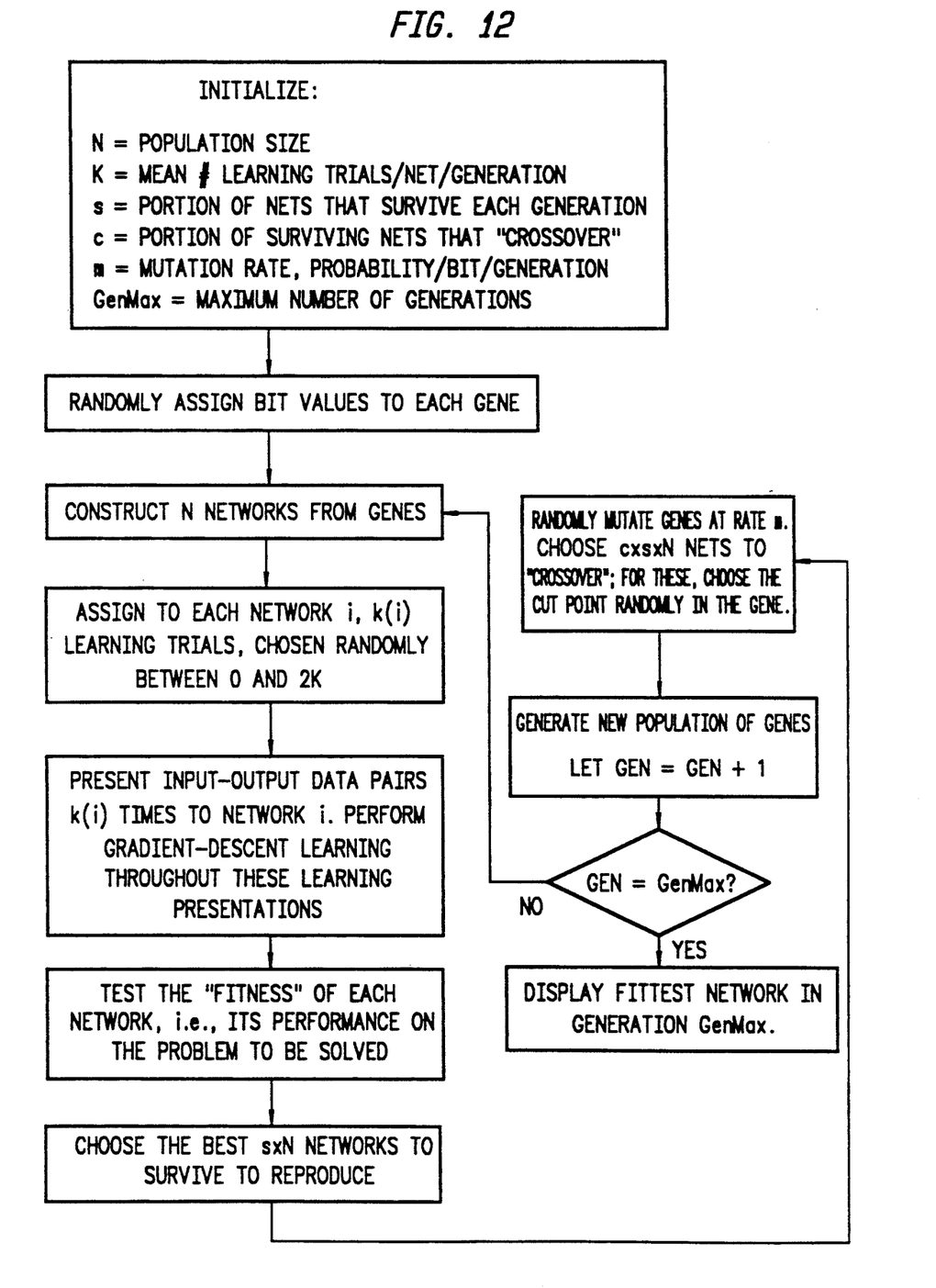
FIG. 12 depicts a flow chart illustrating in more detail the aspects of the present invention.

FIG. 12 shows a flow chart for hybrid neural network-genetic algorithm system.

Figure 13A:
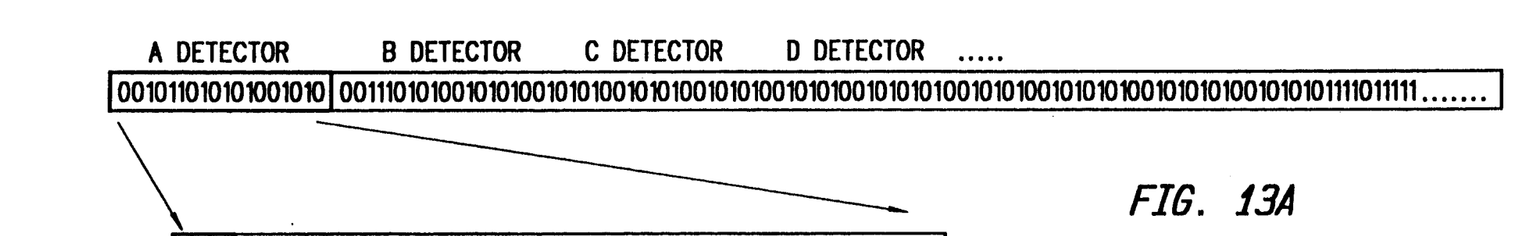
Figure 13B:
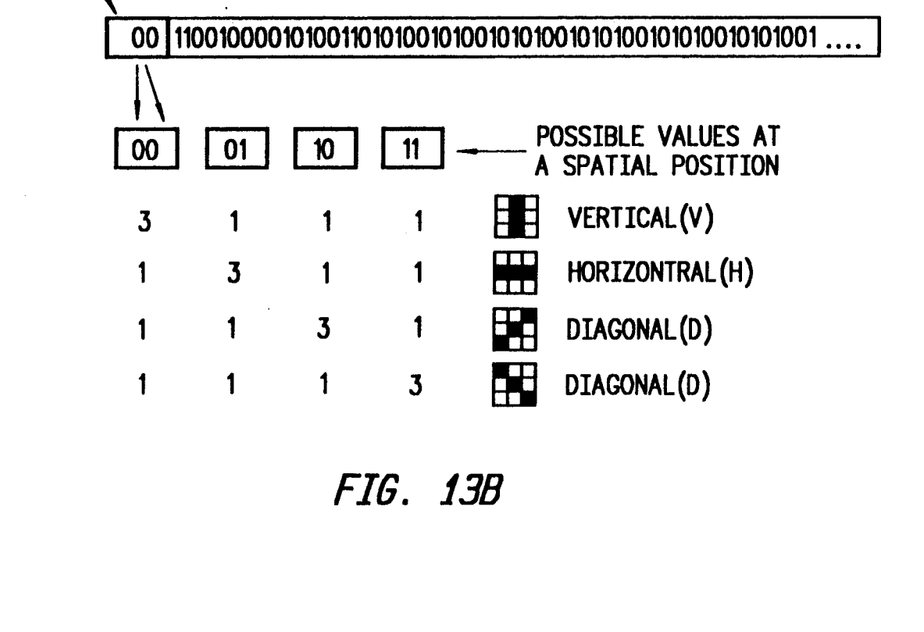
Figure 14A:
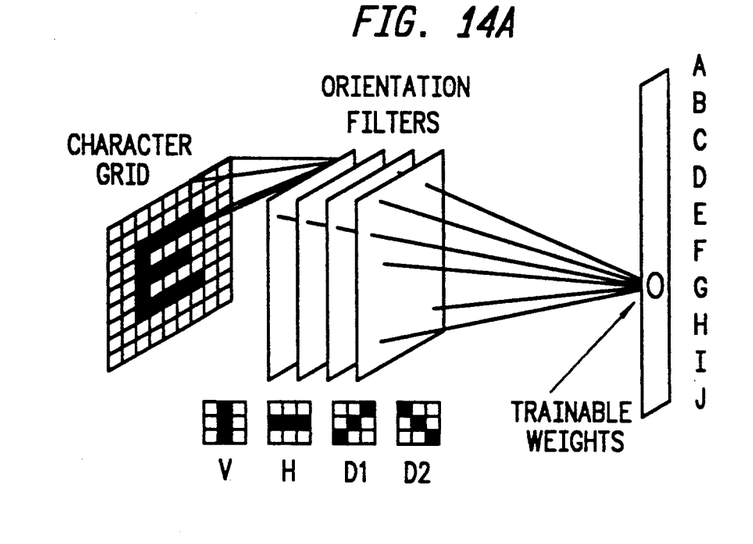
Figure 14B:
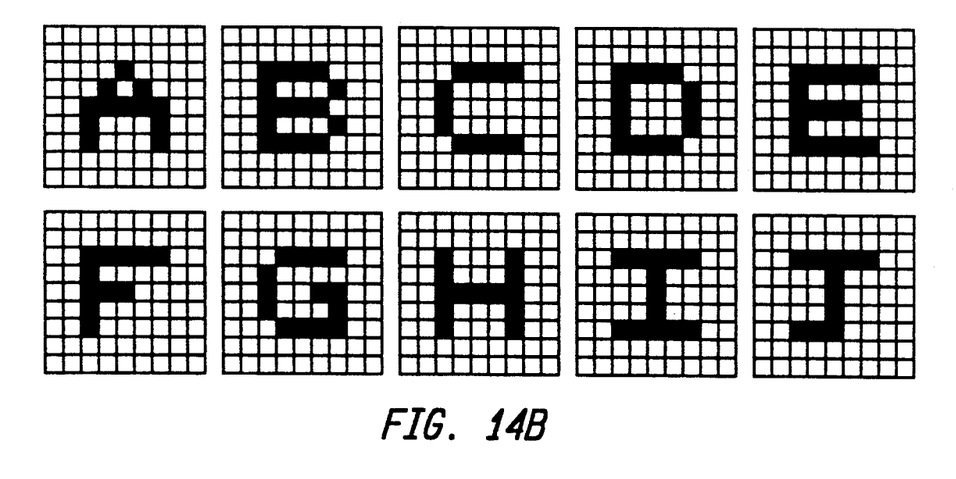
Figure 14C:
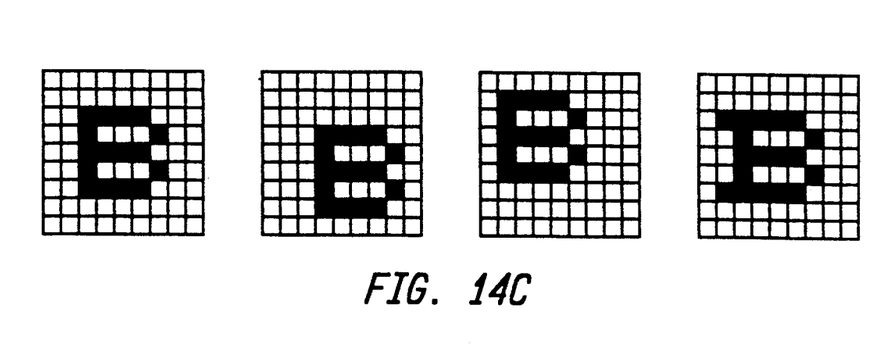
Figure 15A:
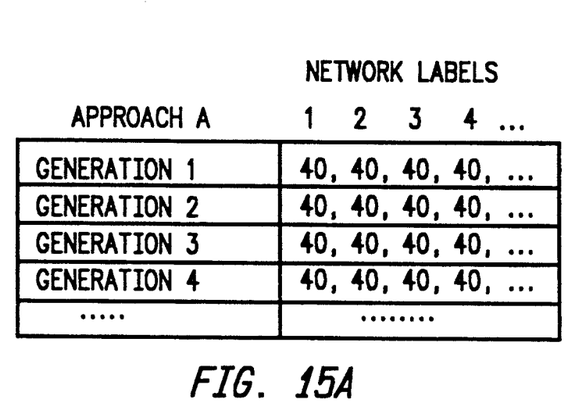
FIGS. 15A, 15B and 15C depict an illustration showing the most rapid evolution according to the present invention.
Figure 15B:
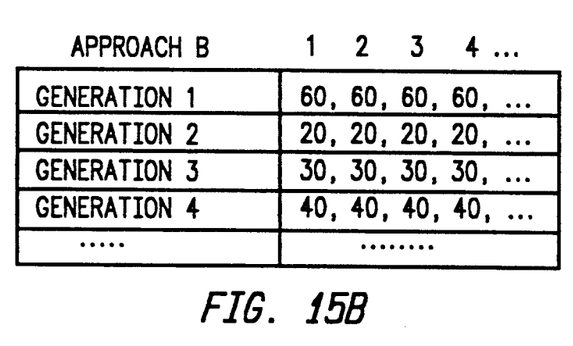
Figure 15C:
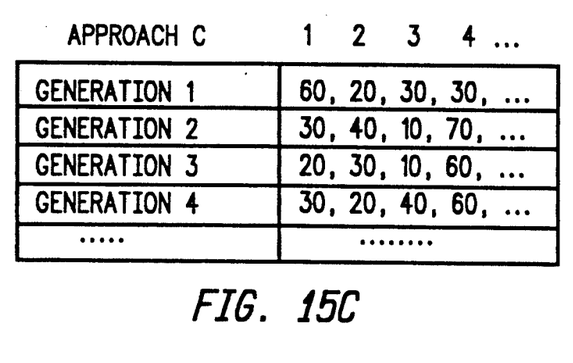

FIGS. 13-15 illustrate an application of the overall algorithm to optical character recognition. The key is how do you represent the connection strengths in genes. In FIG. 13-A, the long string of one's and zeroes (the genes) gets converted into connection strengths in the network.

FIG. 13-A shows a long gene (980 bits), split into, in this case, 10 categories (for ten characters A-J). The A detector in FIG. 13-A takes 1/10 of those genes. The B detector takes another 1/10 and so forth all the way across. Each detector includes 49 two bit numbers specifying initial connection strengths between filter layers and category unit (10 categories * 49 filter positions * 2 bits=980 bits total). FIGS. 14-A, B and C depict a network architecture comprising a character grid, orientation filters and 10 training patterns including translation. In the A detector, those genes will determine the connection strength between the orientation filters in FIG. 14-A and the A detector in the network.

FIG. 13-B depicts the relative initial weights between filters (at spatial position) and category. The first two bits of the category detector can have four possible values 00, 01, 10, 11. For each one of those, that tells you which of those four orientations is most strongly connected to the category detector. For instance, suppose the first two values are zero-zero. That says you are a vertical detector. The connection strength is from the upper corner, the orientation filter in FIG. 14-A, back to the category units, also in FIG. 14-A.

If the first two bits are 0, 0, it says you want to be a vertical detector, so there will be a strong connection between the vertical detector layer and category A.

The relative strength is 3 to 1 to 1 to 1, as shown in FIG. 13-B. So if the gene has the value of 00, it says you are a vertical detector with a strength 3. You are a horizontal detector with only a strength 1 and the diagonals would only have strength 1. In FIG. 14-A, these are the vertical V, horizontal H and two diagonal D1, D2 detectors of the orientation filters.

In FIG 14-A, the gene tells you which of the strengths is most strongly connected. For the A detector, the first two bits will tell you say the upper corner, whether it is a vertical detector or which of the four detectors it is. The next two bits tell you next point over. The next two bits tell you the next point over the orientation filters, all in FIG. 14-A. Likewise for detector B, that will determine the connection strength from those to the B detector in FIG. 14-A all the way through.

If the genes are given, it can be determined what the genes represent in FIG. 13-A and FIG. 13-B of picture A. The initial connection strengths can be determined in FIG. 14-A. Learning will come later. This is what the genetic part is.

In learning, you are going to refine those connections even through they start off with a value of say 3 and 1 and 1 and 1. After you learn by giving patterns of the FIG. 14-B, the letter (character) to be learned and the category that it is, you will change those ways.

One embodiment of the present invention uses a gradient descent method. However, there are alternatives. The basic concept is to use a learning algorithm to change those weights to reduce the error between what the actual, what the network says is the output and the value that it should be getting.

The system learns and learns and ultimately it will have different weight values, no longer just 3, 1, 1, 1, it could be 2, 0, 0.5, 0.6 or whatever and that will be all the way throughout the network.

Then you test your network—you give it new patterns and say can you recognize this and those that do well are going to survive in the genetic algorithm, those that do not do well are not going to survive. We are testing after they have learned.

The genes gave the initial connection and we can test them on that, but that's not what the present algorithm is about. The present algorithm allows the system to learn and then you decide. One thing that we have found that is of crucial importance for the power and success is the following thing: when you present patterns to the system to learn, how many times do you do it? Do you just give them one pattern of the letters (characters) to be learned or do you do it many, many times? Because the more times you do it the more you're going to change those weights, improving the performance up to say some level.

There are several approaches to accomplish this as represented in FIGS. 15-A, 15-B and 15-C. Approach A, shown in FIG. 15-A, gives to each network the exact same number of learning trials, say 40. One of those networks that survives, train it 40 times. The other one train it 40 times. This approach is shown in FIG. 15-A.

Approach B—for the same overall average number, say 40 is being our average, we could use approach B shown in FIG. 15-B where on the first try you give 60 to each. The second generation 20 to each. The third generation 30 each or whatever, so that, on the average, the average is 40. In Approach B shown in FIG. 15-B, some generations receives less than the average.

Approach C shown in FIG. 15-C is within each generation you give different networks different numbers of learning trials, 60, 20, 30, 30, 5, 11 whatever all the way through and like if it was generation 2 you give different ones.

Approach C shown in FIG. 15-C, is by far the superior of these. The system trains each network to perform the problem task where the number of learning trials per network is randomly chosen. Approach C is a uniform distribution of learning trials where the number of learning trials is constant.

FIG. 4 shows the population average fitness at birth after 100 generations, versus the number of learning trails given per generation in FIG. 15-C, (40 on the average). What if the network had done 20? What if the network had done 60? This is how the things work.

If very little learning is put in at the number of learning trials, the network does not do that well. But if the network puts in some of the learning as pointed out, it does better. Also, as shown, if you have too much learning it drops down, in fact it can even go down beneath. There is an optimal amount of learning trials per generation that gives you the fastest evolution.

As far as applications, it could be for parallel computers which have many individual processors. The overall direction in programming now is away from programming. Instead of having lots of people writing computer code, you allow the system machines to learn.

There is an interest to make machines learn as much as possible, especially for complicated problems like speech recognition and character recognition. With these distributed systems you want to be able to take advantage of the fact that you have lots of different separate processors all going on simultaneously. That's the power of multi-processors.

These are well suited to evolutionary issues. You can have each processor trying the problem and only the best one survive. Get a new generation and so one uses a suitable computer. For some tasks, the present algorithm will be the way to set a computer to evolve the best system for CR (character recognition), for speech recognition or the like.

The foregoing descriptions of specific embodiments of the present invention have been presented for purposes of illustration and description. They are not intended to be exhaustive or to limit the invention to the precise forms disclosed, and it should be clear that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

NOTES AND REFERENCES

Baldwin, J. M. "A new factor in evolution," American Naturalist 30, 4 1–451 (1896)

Chomsky, N. Syntactic Structures The Hague: Mouton (1957)

Crick, F. W. "Central Dogma of Molecular Biology," Nature 227, 561-56 (1970)

Goldberg, D. E. Genetic Algorithms in Search, Optimization & Machine Learning Reading, MA: Addison-Wesley (1989).

Hinton, G. E. and Nowlan, S. J. "How learning can guide evolution," Complex Systems 1, 495-502 (1987)

Holland, I. H. Adaptation in Natural and Artificial Systems University of Michigan Press (1975)

Stork, D. G. and Keesing, R. "The distribution of learning trials affects evolution in neural networks" (1991, submitted) work done entirely at Ricoh California Research Center.

We claim:

1. In a neural network system for use in application tasks including optical character recognition techniques, an evolutionary evaluation and learning method comprising the steps of:

forming plural genetic representations of an application task including recognizing a plurality of characters where each character has a bit configuration specifying initial connection strengths between filter lays and category units, converting said plural genetic representations to neural networks, assigning to each network i, k(i) learning trails, chosen randomly between zero and 2K, and training each neural network to optimally perform the application task including optical character recognition where the number of learning trials per network is randomly chosen.

2. The system as in claim 1 wherein said training step includes gradient descent learning utilizing backpropagation.

3. The system as in claim 2 including the step of constructing a population of genes for said neural networks and converting said genes to neural networks.

4. The system as in claim 3 wherein the training of each network to perform said application task includes the step of testing each network on the task.

5. The system as in claim 4 including the step of determining whether the performance is within a predetermined percentage and if not discarding said network and if so utilizing a genetic algorithm process of crossover mutation and replication to determine new genes for the next generation.

6. The system as in claim 1 having initial parameters of N equals population size, K equals mean number of learning trials/net/generation, s equals portion of nets that survive each generation, c equals portion of surviving nets that crossover, M equals mutation rate, probability/bit/generation, and GenMax equals maximum number of generations, the method including the steps of:

initializing the population size having a size N, a mean number of learning trials per net per generation having a value K, a portion of networks that survive each generation having a value S, a portion of the surviving networks that crossover having a value C, a mutation rate, probability/bit/generation having a value M, and a maximum number of generations equal to Genmax, randomly assigning bit values to each gene, constructing N networks from said genes, and presenting input/output data pairs k(i) times to said network i and performing gradient descent learning throughout said learning presentations.

7. The system as in claim 6 including the step of testing the fitness of each network, including the performance fitness on the problem to be solved.

8. The system as in claim 7 including the step of choosing the best $S \times N$ networks to survive in order to reproduce and randomly mutating genes at rate M by choosing $C \times S \times N$ networks to crossover mutation so as to chose the cut point randomly in the gene.

9. The system as in claim 8, including the step of generating a new population of genes Gen where Gen=Gen+1 and if Gen=Genmax, displaying the fittest network in the generation Genmax and if not, constructing N networks from said genes.

10. In a neural network system for use in application tasks, an evolutionary evaluation and learning method comprising the steps of:

forming a genetic representation of an application task having a bit configuration specifying initial connection strengths between filter layers and category units, converting said genetic representation to neural networks, assigning to each network i, k(i) learning trials, chosen randomly between zero and 2K, and training each neural network to optimally perform the application task where the number of learning trials per network is randomly chosen.

* * * * *